United States Patent
Heaven, Jr. et al.

(10) Patent No.: US 7,878,449 B2
(45) Date of Patent: Feb. 1, 2011

(54) MASS TRANSFER SYSTEM FOR STABILIZING AN AIRSHIP AND OTHER VEHICLES SUBJECT TO PITCH AND ROLL MOMENTS

(75) Inventors: George H. Heaven, Jr., North Las Vegas, NV (US); Michael K. Walden, North Las Vegas, NV (US)

(73) Assignee: LTAS Holdings, LLC, North Las Vegas, NV (US)

( * ) Notice: Subject to any disclaimer, the term of this patent is extended or adjusted under 35 U.S.C. 154(b) by 0 days.

(21) Appl. No.: 12/052,656

(22) Filed: Mar. 20, 2008

(65) Prior Publication Data
US 2008/0164370 A1 Jul. 10, 2008

(51) Int. Cl.
*B64C 17/00* (2006.01)
(52) U.S. Cl. ..................................... 244/93
(58) Field of Classification Search ............. 244/135 C, 244/30, 31, 96, 97, 118.1, 94
See application file for complete search history.

(56) References Cited

U.S. PATENT DOCUMENTS

| | | |
|---|---|---|
| 1,243,556 A | 10/1917 | Reynolds |
| 1,569,161 A | 1/1926 | Valkenberg |
| 1,818,104 A | 8/1931 | Sperry |
| 2,062,018 A | 11/1936 | Wheeler |
| 2,088,062 A | 7/1937 | Ernest |
| 2,158,180 A | 5/1939 | Goddard |
| 2,252,342 A | 8/1941 | Finley |
| 2,585,480 A | 2/1952 | Makhonine |
| 2,774,305 A | 12/1956 | Fitzgerald |
| 2,794,929 A | 6/1957 | Adamski |
| 2,807,428 A | 9/1957 | Wibault |
| 2,856,142 A | 10/1958 | Haviland |
| 2,857,122 A | 10/1958 | Maguire |
| 2,936,137 A | 5/1960 | Chomo |
| 2,963,245 A | 12/1960 | Bolton |
| 3,006,288 A | 10/1961 | Owen |

(Continued)

FOREIGN PATENT DOCUMENTS

CN 1133581 10/1996

(Continued)

OTHER PUBLICATIONS www.answers.com, "Compartment," pp. 1-5.

(Continued)

*Primary Examiner*—Timothy D Collins
*Assistant Examiner*—Valentina Xavier
(74) *Attorney, Agent, or Firm*—Snell & Wilmer L.L.P.

(57) ABSTRACT

The invention relates to a mechanism to control the pitch and/or roll and/or center of gravity of a vehicle. The first embodiment is a track-based mass transfer system in which pathways are positioned along or radially terminate at a central horizontal plane of the vehicle to move one or more mass transfer devices to a desired location to control the pitch and/or roll and/or center of gravity of the vehicle. A second embodiment is a fluid mass distribution system in which one or more conduits selectively distribute a fluid to one or more tanks positioned near a central horizontal plane of the vehicle to control the pitch and/or roll and/or center of gravity of the vehicle.

2 Claims, 12 Drawing Sheets

U.S. PATENT DOCUMENTS

| | | | |
|---|---|---|---|
| 3,030,049 A | 4/1962 | Pilkington, Jr. et al. |
| 3,128,845 A | 4/1964 | Parker |
| 3,286,630 A | 11/1966 | Salmirs et al. |
| 3,304,874 A | 2/1967 | Cecil |
| 3,489,374 A | 1/1970 | Morcom |
| 3,537,669 A | 11/1970 | Modesti |
| 3,715,092 A | 2/1973 | Moyer et al. |
| 3,742,769 A | 7/1973 | Crutcher et al. |
| RE28,454 E | 6/1975 | Fitzpatrick et al. |
| 3,963,198 A | 6/1976 | Vaughan |
| 3,971,533 A | 7/1976 | Slater |
| 3,972,492 A | 8/1976 | Milne |
| 3,972,493 A | 8/1976 | Milne |
| 3,985,320 A | 10/1976 | Brady |
| 4,009,850 A | 3/1977 | Hickey |
| 4,014,280 A | 3/1977 | Laxo |
| 4,014,483 A | 3/1977 | MacNeill |
| 4,032,085 A | 6/1977 | Papst |
| 4,047,729 A | 9/1977 | Smith |
| 4,073,516 A | 2/1978 | Kling |
| 4,085,912 A | 4/1978 | Slater |
| 4,089,492 A | 5/1978 | Lang |
| RE30,129 E | 10/1979 | Crompton |
| 4,173,324 A | 11/1979 | Rudmann |
| 4,215,832 A | 8/1980 | Horn |
| 4,261,536 A | 4/1981 | Melcher et al. |
| 4,264,045 A | 4/1981 | Campbell |
| 4,269,375 A | 5/1981 | Hickey |
| 4,272,042 A | 6/1981 | Slater |
| 4,307,856 A | 12/1981 | Walker |
| 4,326,681 A | 4/1982 | Eshoo |
| 4,436,259 A | 3/1984 | Schmidt et al. |
| 4,591,112 A | 5/1986 | Piasecki et al. |
| 4,606,515 A | 8/1986 | Hickey |
| 4,616,567 A | 10/1986 | Romer et al. |
| 4,674,705 A | 6/1987 | Schleicher |
| 4,829,903 A | 5/1989 | Axinger et al. |
| 4,967,983 A | 11/1990 | Motts |
| 5,005,783 A | 4/1991 | Taylor |
| 5,071,090 A | 12/1991 | Takahashi et al. |
| 5,110,070 A | 5/1992 | Hagenlocher et al. |
| 5,240,206 A | 8/1993 | Omiya |
| 5,285,986 A | 2/1994 | Hagenlocher |
| 5,294,076 A | 3/1994 | Colting |
| 5,313,851 A | 5/1994 | Hull et al. |
| 5,348,251 A | 9/1994 | Ferguson |
| 5,348,254 A | 9/1994 | Nakada |
| 5,349,915 A | 9/1994 | Thomas et al. |
| 5,358,200 A | 10/1994 | Onda |
| 5,383,627 A | 1/1995 | Bundo |
| 5,439,191 A | 8/1995 | Nichols et al. |
| 5,568,902 A | 10/1996 | Hurley, Jr. |
| 5,597,141 A | 1/1997 | Storaasli |
| 5,730,390 A | 3/1998 | Plichta et al. |
| 5,755,402 A | 5/1998 | Henry |
| 5,823,468 A | 10/1998 | Bothe |
| 5,909,857 A | 6/1999 | Filimonov |
| 6,010,093 A | 1/2000 | Paulson |
| 6,019,311 A | 2/2000 | Thyen |
| 6,237,342 B1 | 5/2001 | Hurford |
| 6,305,641 B1 | 10/2001 | Onda |
| 6,311,925 B1 | 11/2001 | Rist |
| 6,340,137 B1 | 1/2002 | Davis et al. |
| 6,354,535 B1 | 3/2002 | Perry et al. |
| 6,386,480 B1 | 5/2002 | Perry et al. |
| 6,427,943 B2 | 8/2002 | Yokomaku et al. |
| 6,527,223 B1 | 3/2003 | Mondale |
| 6,540,178 B1 | 4/2003 | Hillsdon |
| 6,581,872 B2 | 6/2003 | Walmsley |
| 6,581,873 B2 | 6/2003 | McDermott |
| 6,607,163 B2 | 8/2003 | Perry et al. |
| 6,609,680 B2 * | 8/2003 | Perry et al. ............... 244/30 |
| 6,634,593 B2 | 10/2003 | Lepretre et al. |
| 6,648,272 B1 | 11/2003 | Kothmann |
| 6,685,137 B2 | 2/2004 | Darbyshire |
| 6,698,686 B2 | 3/2004 | Ogawa et al. |
| 6,708,922 B1 | 3/2004 | Hamilton |
| 6,726,153 B1 | 4/2004 | Campbell |
| 6,742,741 B1 | 6/2004 | Rivoli |
| 6,857,601 B2 | 2/2005 | Akahori |
| 6,913,228 B2 * | 7/2005 | Lee et al. ............... 244/135 C |
| 2001/0004098 A1 | 6/2001 | Smith et al. |
| 2001/0028018 A1 | 10/2001 | Darbyshire |
| 2002/0153449 A1 | 10/2002 | Hatzistelios |
| 2003/0098388 A1 | 5/2003 | Walmsley |
| 2005/0120815 A1 | 6/2005 | Love |
| 2005/0184475 A1 | 8/2005 | Hamm |
| 2005/0184476 A1 | 8/2005 | Hamm |

FOREIGN PATENT DOCUMENTS

| | | |
|---|---|---|
| TW | 402571 | 8/2000 |
| TW | 479038 | 3/2002 |
| TW | 519528 | 2/2003 |
| TW | 265313 | 5/2005 |

OTHER PUBLICATIONS www.answers.com, "Trim . . . is a way to," pp. 1-2.
www.answers.com, "Trim is a kind of," pp. 1-2.
www.wikipedia.org, "Aircraft Flight Control System," Jun. 8, 2004, pp. 1-3.
"Lighter-Than-Air High Altitude Platform Feasibility Study," Luffman, C.R., (May 9, 2004).
"AeroRaft™ —A Brief Insight," Luffman, C.R., (Mar. 21, 2005).

* cited by examiner

MASS TRANSFER SYSTEM FOR STABILIZING AN AIRSHIP AND OTHER VEHICLES SUBJECT TO PITCH AND ROLL MOMENTS

FIELD OF THE DISCLOSURE

Various embodiments of the invention relate generally to a system for stabilizing a vehicle subject to pitch and roll moments. More particularly, at least one embodiment of the invention relates to a mass transfer system for stabilizing an airship subject to pitch and roll moments.

DESCRIPTION OF RELATED ART

Typically, a lighter-than-air or buoyant aircraft (commonly referred to as an "airship") includes an envelope, one or more gas-filled cells containing a lifting gas, a propulsion system, a steering system and a gondola or carriage compartment. Airships, like other aircraft, generally rely on external control mechanisms (e.g., elevators, fins, rudders, etc.) to control the attitude of the airship and stabilize the airship in flight. Airships are generally subject to moments along three axes, which can be defined by three primary control vectors. The three primary control vectors are pitch (rotation about the lateral axis), roll (rotation about the longitudinal axis) and yaw (rotation about the vertical axis).

Conventional control systems rely on external control mechanisms to create aerodynamic forces causing the airship to pitch, roll and/or yaw as desired, primarily to counteract external forces (e.g., a gust of wind or clouds) that would otherwise destabilize the airship in flight. Conventional control systems are also used to adjust the angle of attack for airships that depend on dynamic lift and reverse dynamic lift for takeoff and landing. These external control mechanisms, however, are inefficient because they add significant weight to the airship and their operation also generates drag, which slows the airship as it moves in the desired direction. These external control mechanisms generate drag even when they are not activated, because they tend to disrupt the aerodynamic shape of the airship. Additionally, these conventional control systems do not perform well in very slow or hovering flight because insufficient airflow is generated over the external control mechanisms.

SUMMARY OF THE INVENTION

One embodiment of the invention is an airship that may include a hull having an inner surface defining a cavity and an outer surface, a cabin coupled to the outer surface of the hull, a propulsion device coupled to the outer surface of the hull for providing yaw control, and a sensor for detecting a pitch and/or roll movement of the hull. The airship may also include a pathway positioned adjacent to the hull, a mass transfer device configured to move along the pathway, and a control device for receiving a pitch signal and/or a roll signal from the sensor and, using the pitch signal and/or the roll signal, controlling the movement of the mass transfer device along the pathway to stabilize the airship and/or to achieve a desired pitch and/or roll orientation. The mass transfer device may be configured to move along the pathway to adjust the airship's center of gravity toward the airship's center of pressure.

One embodiment of the invention relates to a stability control system for a vehicle that employs a mechanism to control the pitch and/or roll of the vehicle. The system may include a pathway disposed adjacent to a perimeter of the vehicle, a mass transfer device movably coupled to the pathway, and a controller configured to cause the mass transfer device to move from a first location on the pathway to a second location on the pathway to achieve a desired pitch or roll orientation.

One embodiment of the invention provides a stability control system for a lenticular, disc-shaped airship which includes one or more tracks disposed around the internal and/or external equator of the airship and one or more mass transfer devices (e.g., moveable units such as mechanical or robotic sleds) coupled to the one or more tracks, each mass transfer device carrying or acting as a weight and including a drive mechanism to move the mass transfer device along the one or more tracks. One or more sensors may be used to detect the pitch and/or roll of the airship and provide one or more corresponding output signals. A controller may receive one or more output signals from the one or more sensors and provide one or more signals to move the one or more mass transfer devices to a location along the one or more tracks to achieve a desired pitch and/or roll orientation.

One embodiment of the invention relates to a system for providing pitch and roll stability to a vehicle. The system may include a plurality of tanks disposed about a central horizontal plane of the vehicle, a conduit coupled to the plurality of tanks for carrying a fluid to and from the plurality of tanks, and a controller configured to cause the fluid to move to or from the plurality of tanks to achieve a desired pitch and/or roll orientation.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. For instance, the term "pathway" may include, but is not necessarily limited to, a track, a guide, a passageway, a path, a rail, a tube, and/or a tunnel on or through which a device (e.g., a mass transfer device) may be guided and/or may ride. The term "mass transfer device" may include, but is not necessarily limited to, a sled, a weight, a cart, and/or a device capable of moving adjacent to, along, through or on the pathway. The term "fluid" may include, but is not necessarily limited to, a gas, an aqueous solution, water, oil, air, and/or other substance.

Figure 1:
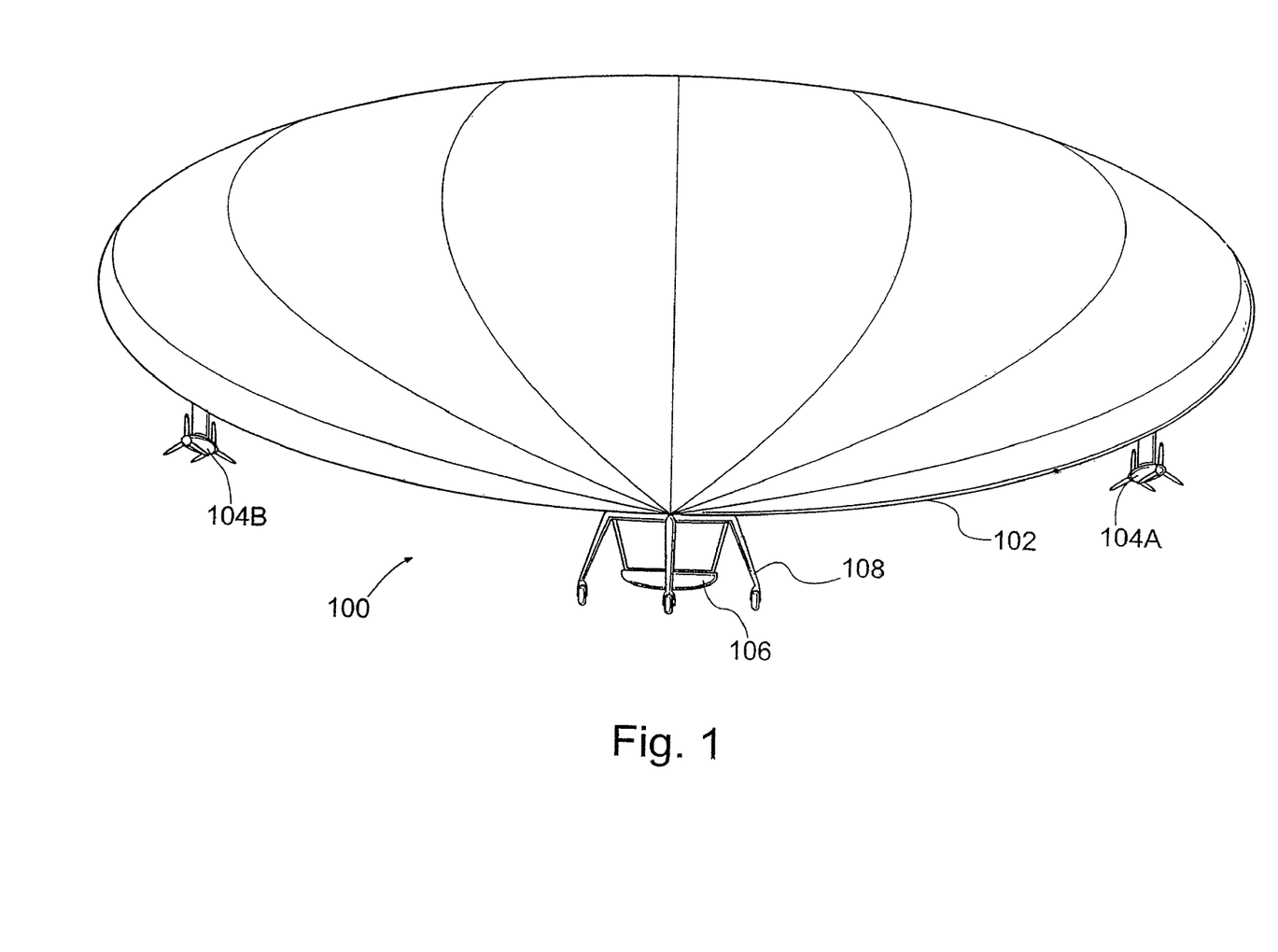
FIG. 1 illustrates a rear perspective view of an airship that employs a control system for stabilizing the pitch and/or roll of the airship according to one embodiment of the invention.
Figure 10:
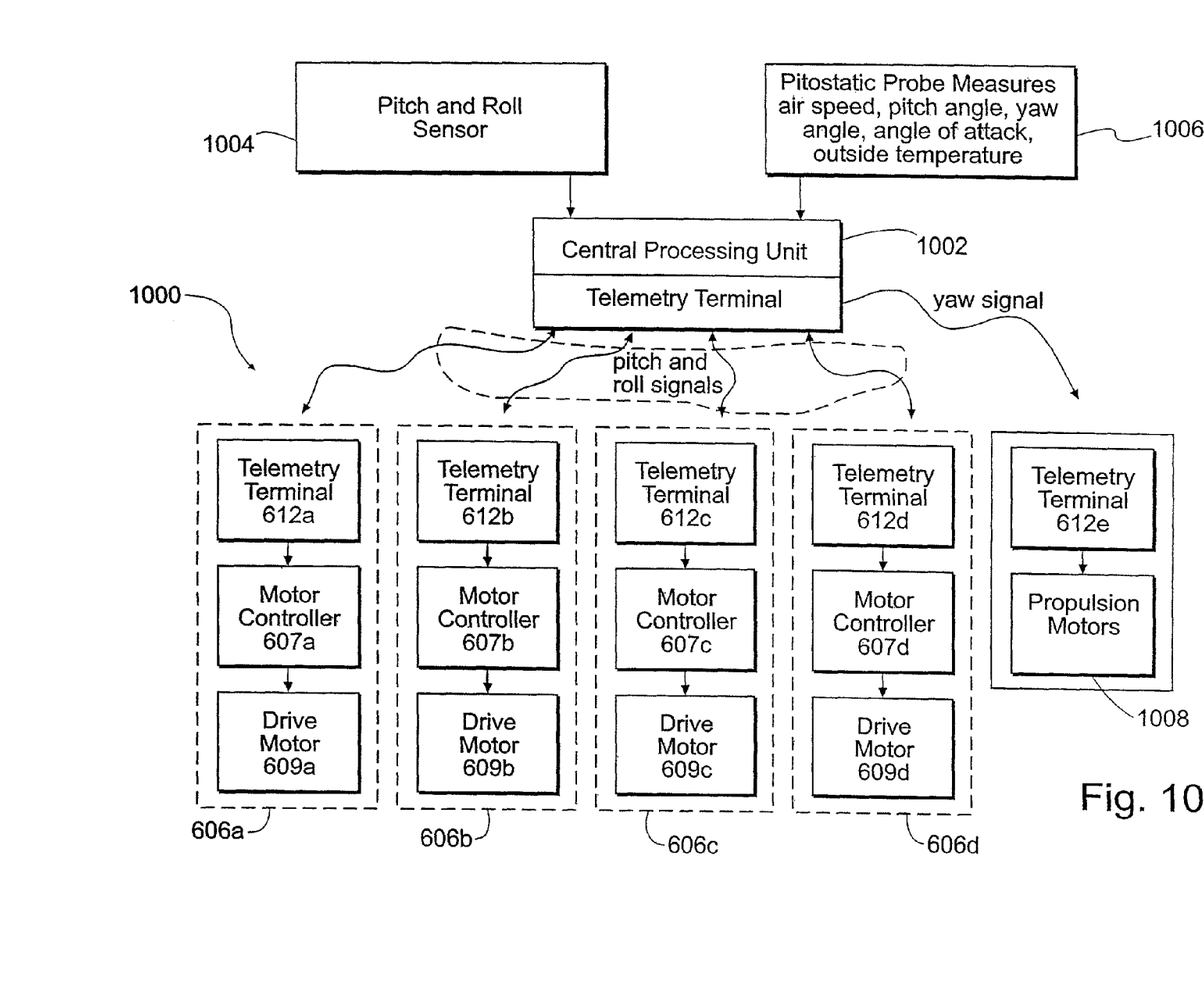
FIG. 10 is a block diagram illustrating a control system for controlling the mass transfer devices of FIG. 6 to adjust the pitch and/or roll of the airship according to one embodiment of the invention.

FIG. 1 illustrates a rear perspective view of an airship 100 that employs a control system (e.g., a pitch and/or roll control system as shown in FIG. 10) for stabilizing the pitch and/or roll of the airship 100 according to one embodiment of the invention. The airship 100 may include a hull 102, a propulsion device 104, a gondola 106 and a plurality of landing supports and wheels 108. The invention described herein is not limited to airships and thus may be used on other vehicles subject to pitch and roll moments. For example, one embodiment of the invention relates to a control system for a boat (e.g., ship, sailboat, yacht, catamaran, or other water-borne vessel) that employs a mass transfer system to stabilize and/or orient the boat.

The hull 102 may be made of a flexible (e.g., fabric) and/or rigid (e.g., lightweight metal or composite) material, or a combination thereof, that provides structural integrity to the airship 100 either alone or in conjunction with an internal structural framework. The hull 102 may be configured in the shape of a sphere, a flattened sphere (i.e., lenticular or "saucer" shape), a donut, a cigar (i.e., resembling a traditional blimp), and various other aerodynamic shapes.

The airship 100 may be non-rigid (the airship's shape is dependent on the gas inside its flexible fabric envelope having a higher pressure than the outside atmosphere), semi-rigid (similar to a non-rigid airship, but with a rigid keel to help maintain its shape), rigid (the airship's shape is maintained by an internal structural framework covered with fabric and the lifting gas is contained by a separate gas cell or cells located within that structural framework) or monocoque (the airship's shape is maintained by a lightweight metal and/or composite load-bearing hull and the lifting gas is contained either directly within that hull or within a separate gas cell or cells contained within that hull).

The hull 102 may be designed to contain lighter-than-air gases (e.g., helium, hydrogen, air, or a mixture of any number of gases) directly or to enclose one or more balloons or cells that may contain lighter-than-air gases. The lighter-than-air gases within the hull 102 may provide all or most of the lifting force so that little or no additional energy is expended to lift the airship 100 into the air. In one embodiment of the invention, the hull 102 may be pressurized.

One embodiment of the invention provides a monocoque airship having a lightweight metal and/or composite hull, which directly contains a lifting gas and provides rigidity to the airship without the need for a separate structural framework.

One embodiment of the invention provides a pressurized fabric envelope that is reinforced with an internal lightweight metal and/or a composite ring disposed around the equator of the hull 102. The composite ring provides solid attachment points for the fabric envelope, and allows it to be pressurized to a greater degree without losing its lenticular shape and deforming into a spherical shape under pressure. The lightweight metal and/or the composite ring disposed around the equator of the hull 102 also serves as a pathway for the various embodiments of the track-based mass transfer system described herein. Regardless of the type of construction that may be employed, the invention may be implemented to provide stability control to any airship.

The airship 100 may also include one or more propulsion devices or systems 104A and 104B, including, but not limited to, propellers, engines, motors, electro-kinetic drives and/or jets, which serve to generate a thrust to move the airship 100 in a particular direction. The propulsion system 104A may operate in the same or in a different manner as the propulsion system 104B, and may be configured to provide yaw control.

The airship 100 may also include a gondola 106 to house an operator, passengers, cargo, equipment, a flight deck, etc. As shown in FIG. 1, the gondola 106 may be positioned outside the hull 102 and centered about the underside of the hull 102 (see also FIG. 2). In other embodiments, the gondola 106 may be located either inside or outside the hull 102 at various locations, and may be located on a track or other device allowing the gondola 106 to be moved forward or aft as desired to adjust the airship's center of gravity (see also FIG. 12A). The airship 100 may include a plurality of landing supports and wheels 108 for takeoff and landing.

Figure 2:
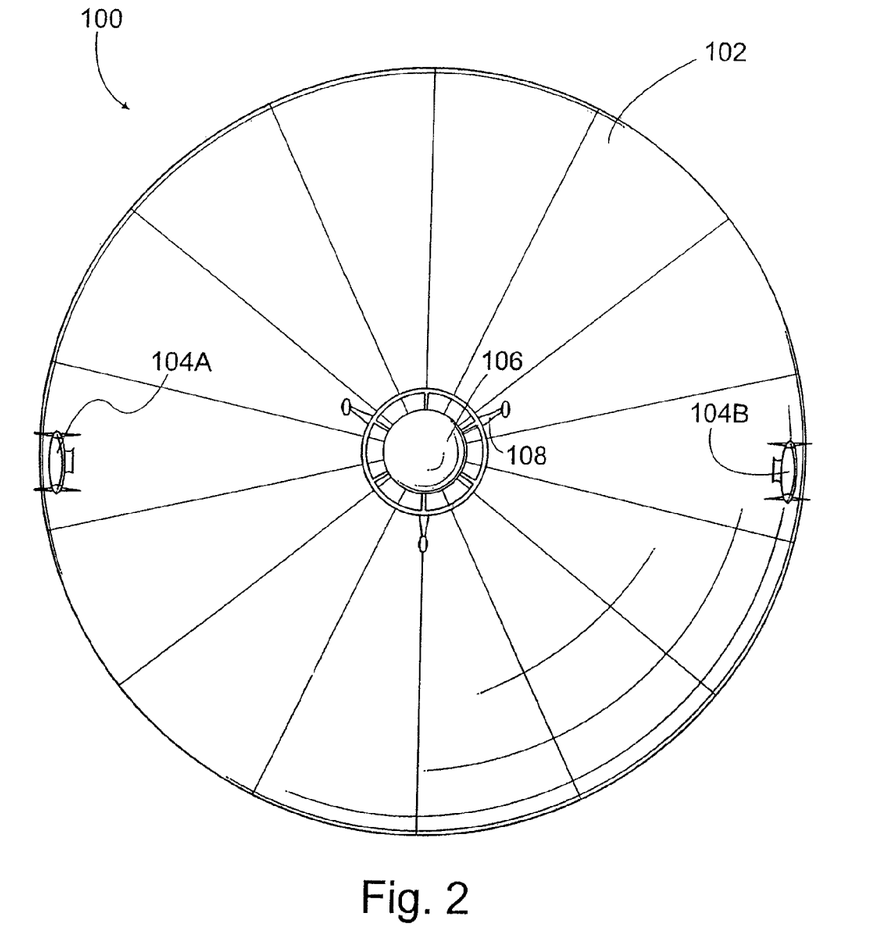
FIG. 2 illustrates an underside view of the airship of FIG. 1 having a control system that employs a mass transfer system to stabilize and/or orient the airship according to one embodiment of the invention.

FIG. 2 illustrates an underside view of the airship 100 of FIG. 1 having a control system (e.g., a pitch and/or roll control system as shown in FIG. 10) that employs a mass transfer system to stabilize and/or orient the airship 100. In one embodiment of the invention, the airship 100 has a lenticular hull 102. This view of the airship 100 also shows the gondola 106 centered about the underside of the airship 100. The airship 100 may also include two or more propulsion motors 104A and 104B disposed at the underside and at opposite locations, sides and/or ends of the airship 100.

Figure 3:
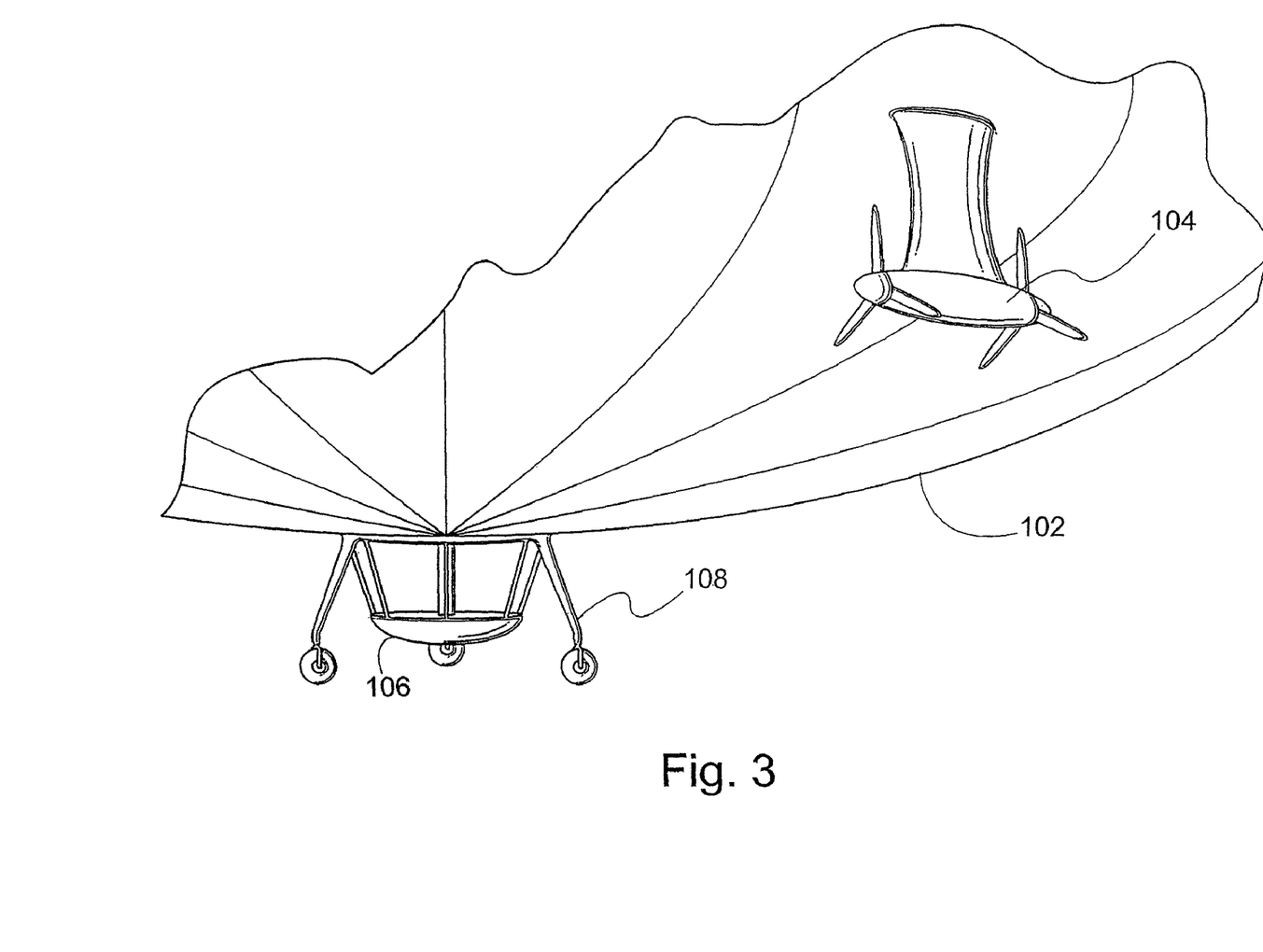
FIG. 3 illustrates a partial perspective side view of the airship of FIG. 1 having a control system according to one embodiment of the invention.

FIG. 3 illustrates a partial perspective side view of the airship 100 of FIG. 1 having a control system (e.g., a pitch and/or roll control system as shown in FIG. 10) that employs a mass transfer system to stabilize and/or orient the airship 100. In one embodiment, each propulsion motor 104A and 104B may have two or more propellers.

The airship 100 illustrated in FIGS. 1-3 has an aerodynamic hull 102 with no external control mechanisms for controlling the pitch and/or roll of the airship 100 (the propulsion motors 104A and 104B may serve as yaw control). This configuration minimizes weight and drag and increases operational efficiency. Conventional external control mechanisms (e.g., fins, elevators, rudder, etc.) for controlling the pitch and/or roll moments tend to increase drag and decrease efficiency, and are superseded and replaced by the features of the invention described herein.

Figure 4:
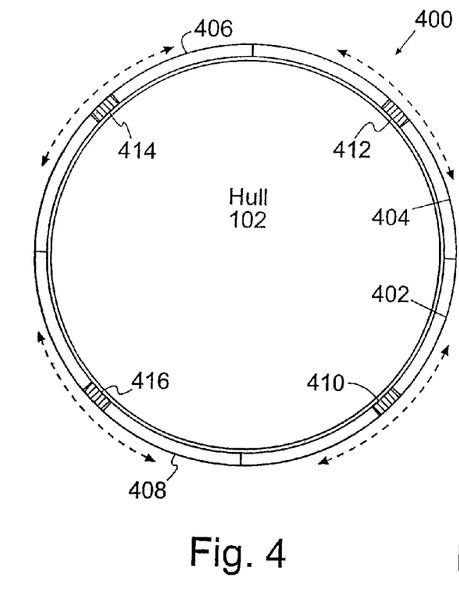
FIG. 4 illustrates a top view of a track-based mass transfer system for controlling the pitch and/or roll of an airship according to one embodiment of the invention.

FIG. 4 illustrates a top view of a track-based mass transfer system 400 for controlling the pitch and/or roll of the airship 100 according to one embodiment of the invention. The mass transfer system 400 includes one or more pathways positioned along the interior or exterior equator of the hull 102 of the airship 100 to move one or more mass transfer devices 410, 412, 414 and 416 to a desired location, thereby affecting the pitch and/or roll of the airship 100 as desired. In one embodiment, four non-overlapping contiguous tracks 402, 404, 406 and 408 are positioned along the interior equator of the hull 102. Each track 402, 404, 406 and 408 may serve to guide and/or move one or more mass-transfer devices 410, 412, 414 and 416 to a desired location on that track. In other embodiments of the invention, a single track may be used to move one or more mass-transfer devices 410, 412, 414 and 416 to a desired location along the interior and/or exterior equator of the hull 102. In yet another embodiment, a plurality of tracks that run along the interior or exterior equator of the hull 102 may be employed. Similarly, a single track having two or more independent rails thereon may be used to move one or more mass transfer devices 410, 412, 414, 416 to a desired location on the track. In another embodiment, one or more tracks can be radially positioned from the center of the hull 102 to the periphery of the hull 102.

In one embodiment, the mass-transfer devices 410, 412, 414 and 416 set in or on the tracks 402, 404, 406 and 408 may be moved via motors (e.g., servo motors, stepper motors, etc.), pneumatics, hydraulics and/or linear magnetic levitation devices to a desired position. In a stable position, the mass transfer devices 410, 412, 414 and 416 may be equally distributed or spaced along the circumference of the airship 100 and/or the hull 102. For instance, the mass transfer devices 410, 412, 414 and 416 may rest at or near the center of their respective tracks 402, 404, 406 and 408 so that they may be moved in either direction to adjust the pitch and/or roll of the airship 100. To counteract an external force (e.g., a gust of wind or clouds) causing a particular pitch and/or roll moment, one or more of the mass transfer devices 410, 412, 414 and 416 may be moved along their respective track(s) to cause a desired amount of weight to be shifted to a particular position and, for example, thereby return the airship 100 to a level position. A controller (e.g., a motor controller) may be configured to cause the one or more mass transfer devices 410, 412, 414 and 416 to move by a certain amount in a particular direction in order to achieve the desired weight distribution for a particular pitch and/or roll moment.

Figure 5:
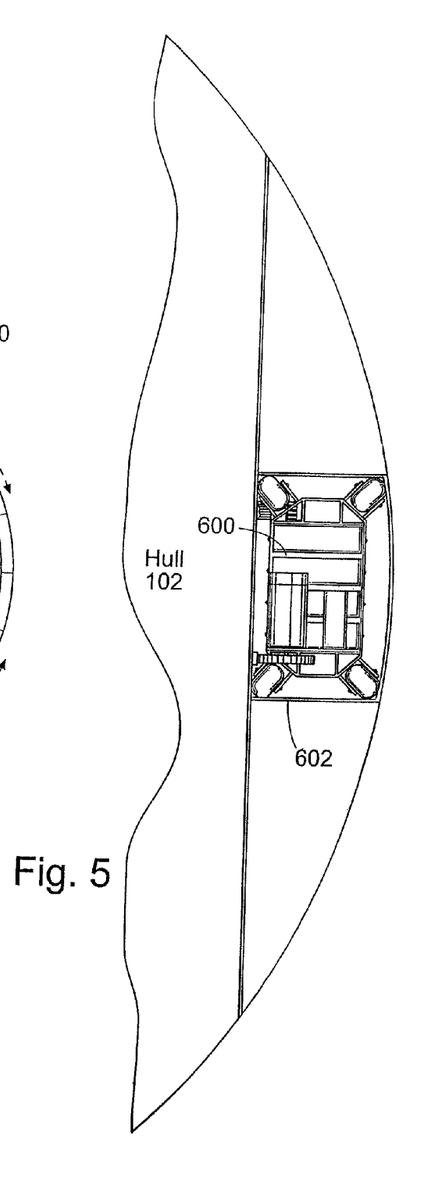
FIG. 5 illustrates a partial cross-sectional side view of the track-based mass transfer system illustrated in FIG. 4 according to one embodiment of the invention.

FIG. 5 illustrates a partial cross-sectional side view of the track-based mass transfer system 400 illustrated in FIG. 4. In this embodiment, the track 602 is located substantially along a central horizontal plane or equator of the hull 102. The mass transfer device 600 is shown riding inside the track 602 on the interior equator of the hull 102. In other embodiments, the mass transfer device 600 may be located on the exterior equator of the hull 102. The mass transfer device 600 may travel, slide or roll on the track 602 to a desired location as determined by the controller.

Figure 6:
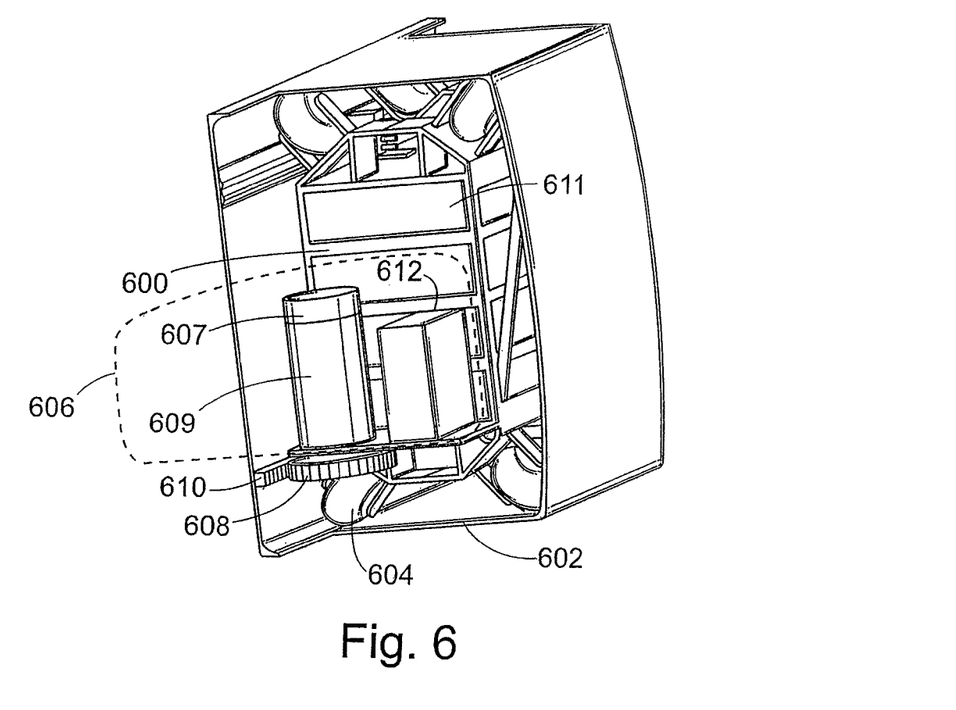
FIG. 6 illustrates a partial perspective view of a mass transfer device that travels along a pathway of a track-based mass transfer system according to one embodiment of the invention.

FIG. 6 illustrates a partial perspective view of a mass transfer device 600 that travels along a pathway 602 of a track-based mass transfer system according to one embodiment of the invention. In one embodiment, the mass transfer device 600 travels inside the pathway 602 using a plurality of wheels 604. The mass transfer device 600 may also include a movement device or system, which may include a motor controller 607 and a drive motor 609, to move the mass transfer device 600 along the pathway 602. The drive motor 609 may be coupled to a drive wheel 608 with gears and/or teeth that rotate such that, during operation of the drive motor 609, the gears and/or teeth on the drive wheel 608 engage a rail 610 and cause the mass transfer device 600 to move along the pathway 602 in the desired direction. The mass transfer device 600 may also include a telemetry terminal 612 positioned adjacent to, on top of, or as a part of the drive motor 609. The telemetry terminal 612 may include an acceleration and/or position sensor for sensing or measuring information pertaining to the mass transfer device 600 and transmitting the information via a wireless link to the central processing unit 1002 (see also FIG. 10). The information may include the position of the mass transfer device 600 on the pathway 602, the acceleration, speed and/or direction of the mass transfer device 600, whether the mass transfer device 600 is functioning properly, and so on.

Figure 7:
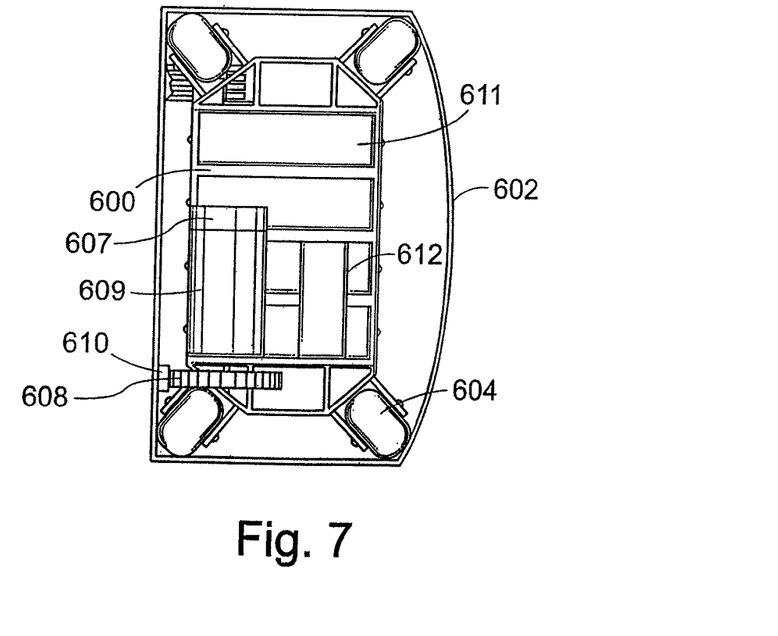
FIG. 7 illustrates an end view of the mass transfer device of FIG. 6 positioned inside the pathway of a track-based mass transfer system according to one embodiment of the invention.

FIG. 7 illustrates an end view of the mass transfer device 600 of FIG. 6 positioned inside the pathway 602 of a track-based mass transfer system according to one embodiment of the invention. The plurality of wheels 604 are coupled to the mass transfer device 600 to permit the mass transfer device 600 to move freely but securely along the pathway 602.

Figure 8:
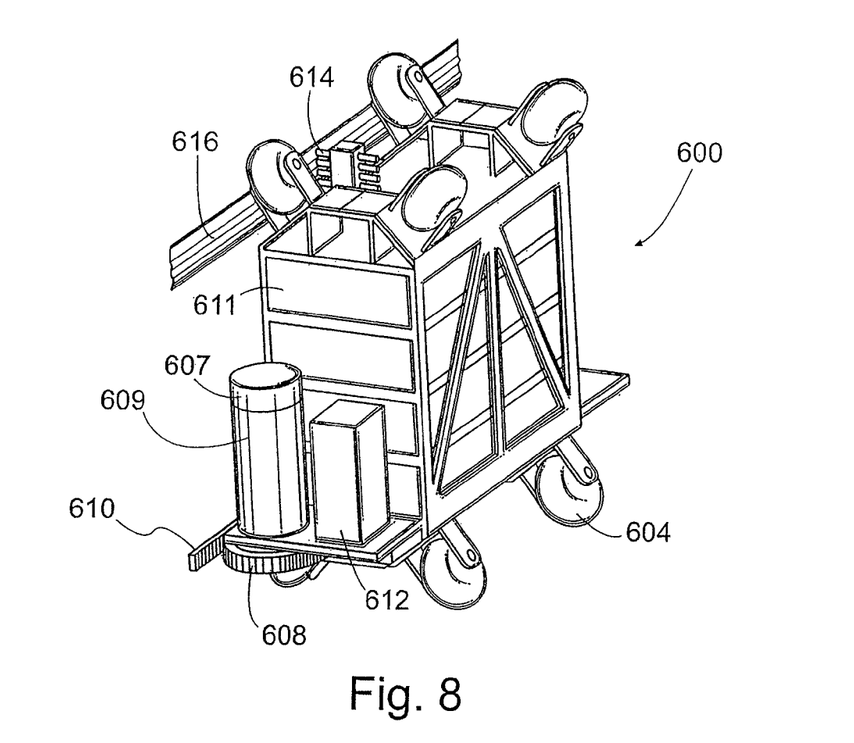
FIG. 8 illustrates a perspective view of the mass transfer device of FIG. 6 according to one embodiment of the invention.

FIG. 8 illustrates a perspective view of the mass transfer device 600 of FIG. 6 according to one embodiment of the invention. According to one embodiment, the mass transfer device 600 may include eight wheels 604 positioned along the perimeter or at each corner of the mass transfer device 600 to contact the surfaces of the pathway 602. In one embodiment, the mass transfer device 600 may include one or more electrically conductive contacts 614 configured to transmit control signals to the motor controller 607 to cause the mass transfer device 600 to move in a particular direction, a certain distance or at a certain speed. Alternatively, optically conductive couplers may be used in place of the electrically conductive contacts 614, to transmit the control signals to the motor controller 607. The electrically conductive contacts 614, or optically conductive couplers, move along and are electrically coupled to a power slip ring 616 over which the control signals are transmitted to the mass transfer device 600.

Figure 9:
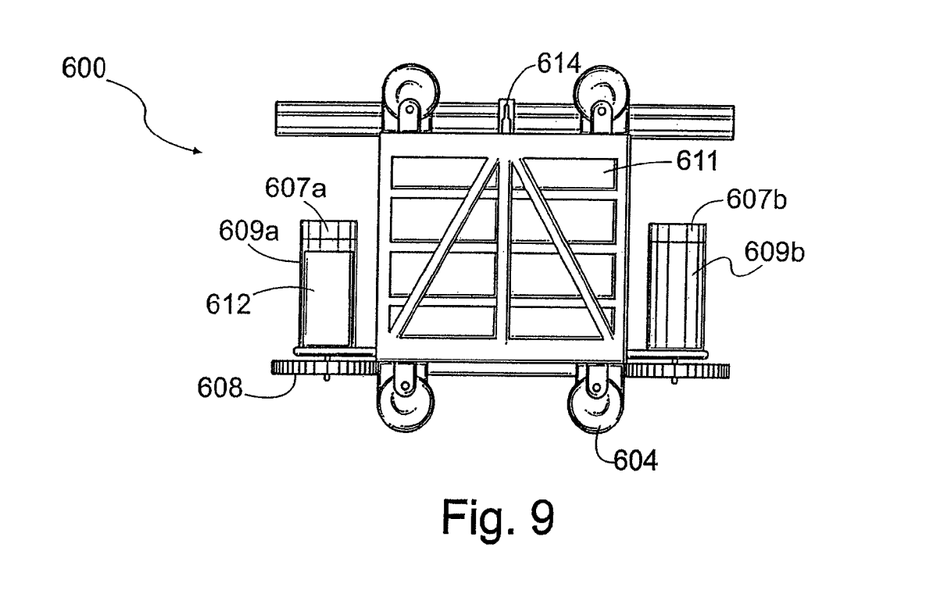
FIG. 9 illustrates a side view of the mass transfer device of FIG. 6 according to one embodiment of the invention.

FIG. 9 illustrates a side view of the mass transfer device of FIG. 6 according to one embodiment of the invention. According to one embodiment of the invention, a plurality of drive motors 609a and 609b may be used to propel or move the mass transfer device 600. As shown, the drive motors 609a and 609b may be positioned at each end of the mass transfer device 600. One or more telemetry terminals 612 can be used for each mass transfer device 600.

According to one embodiment of the invention, the power slip ring 616, which may be attached to the pathway 602, may include one or more electrically conductive strips for providing power to the motors 609a, 609b on the mass transfer device 600. The mass transfer device 600 may include one or more electrically conductive contacts 614 (e.g., contacts, wheels and/or wires) that are in contact with the electrically conductive strips so that power can be carried to the motors 609a, 609b via the motor controller 607. Power may be provided to the electrically conductive strips by a separate power unit, such as one or more batteries, fuel cells, generators, solar cells, etc., or any combination thereof. The power unit(s) may be located at any convenient point(s) on the airship 100.

In one embodiment of the mass transfer device 600, a power source 611 (e.g., a battery, a fuel cell, a generator, etc.) is mounted directly on, and made a part of, each mass transfer device 600. The power source 611 is capable of driving or powering the motors 609a, 609b to move the mass transfer device 600 along the pathway 602. In one embodiment, the power source 611 includes one or more batteries, which may be recharged via the electrically conductive strips.

By placing the power source 611 directly on the mass transfer device 600, the power source 611 itself serves as part of the total overall weight of the mass transfer device 600 that is needed to effectuate pitch and/or roll stability control for the airship 100. This configuration advantageously reduces the total weight that the airship 100 would otherwise need to carry if the power source 611 was placed separately from the mass transfer device 600.

Other power sources, including hydrogen fuel cells, solar cells, generators and/or internal combustion engines, may be employed to power the motors 609a, 609b on the mass transfer device 600 via the power slip ring 616. For instance, solar cells may be mounted on the exterior of the hull 102 of the airship 100 to convert light energy into electricity that can be used by the mass transfer system.

According to one embodiment of the invention, the direction in which the motors 609a, 609b rotate is controlled by the motor controller 607. For example, the motor controller 607 may reverse the current to the motors 609a, 609b to change the direction in which the mass transfer device 600 moves along the pathway 602. The mass transfer device 600 may also include a brake system to secure it to a certain position on the pathway 602 when the motors 609a, 609b are not activated. The brake system may lock the position of the mass transfer device 600 relative to the pathway 602 so that it doesn't freely move as a result of movement by the airship 100. The brake system may be controlled or activated by the same control system that controls the motion of the mass transfer device 600.

The overall weight of the mass transfer system (i.e., the total of the weight of each mass transfer device 600) will vary depending upon the weight of the airship 100 in question and the desired degree of pitch and/or roll control. The overall weight of the mass transfer system may be distributed equally or unequally amongst each mass transfer device 600, as necessary to achieve the desired results.

FIG. 10 is a block diagram illustrating a control system 1000 for controlling the mass transfer devices of FIG. 6 to adjust the pitch and/or roll of the airship 100 according to one embodiment of the invention. The control system 1000 includes a central processing unit (CPU) 1002 that receives input signals from a pitch and roll sensor 1004 (e.g., gyroscope with one or more accelerometers), a pitostatic probe 1006 and/or other data gathering devices, which can measure air speed, pitch angle, yaw angle, angle of attack, and/or outside temperature, and an accelerometer and/or position sensor located at each telemetry terminal 612. The CPU 1002 may include a telemetry terminal to wirelessly transmit information to and wirelessly receive information from one or more telemetry terminals 612. The accelerometer and/or position sensor in each telemetry terminal 612 provides the CPU 1002 with signals corresponding to the position on the pathway 602 of each mass transfer device 600, the acceleration, speed and/or direction of the mass transfer device 600, whether the mass transfer device 600 is functioning properly, and so on. The CPU 1002 receives these signals and provides a corresponding pitch signal, roll signal and/or center of gravity signal to each motor controller 607 of the mass transfer devices 600. The motor controller 607 in each mass transfer device 600 is configured to receive these signals and transmit these signals to the drive motor 609 to cause the mass transfer device 600 to move according to the location/position indicated by the pitch signal, roll signal and/or center of gravity signal received from the CPU 1002. The telemetry terminal 612 may provide a feedback signal to the CPU 1002 to indicate a current position, acceleration, speed, direction and/or condition of the mass transfer device 600. In one embodiment, a pilot or operator may override the motor controller 607 and manually command one or more drive motors 609 to move to a desired position.

Figure 11A:
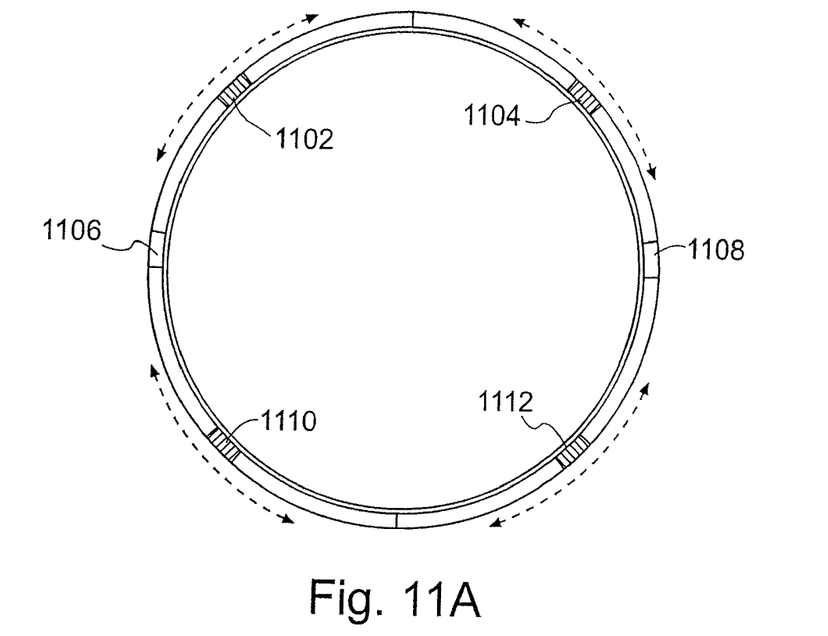
FIG. 11A illustrates a top view of a track-based mass transfer system having six mass transfer devices used to adjust a vehicle's center of gravity and provide pitch and roll stability according to one embodiment of the invention.
Figure 11B:
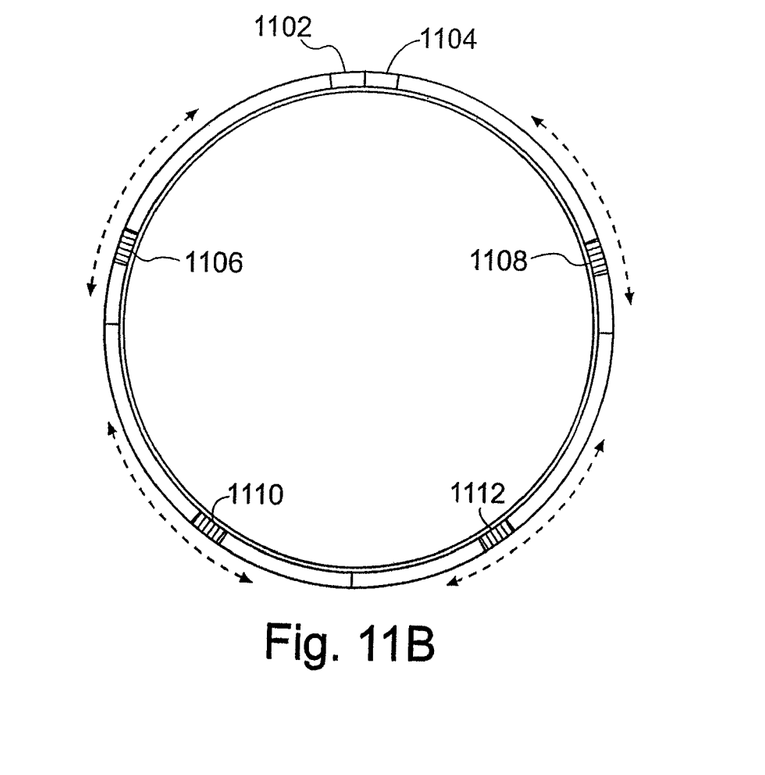
FIG. 11B illustrates a top view of a track-based mass transfer system having six mass transfer devices used to adjust a vehicle's center of gravity and provide pitch and roll stability according to one embodiment of the invention.

FIGS. 11A and 11B illustrate top views of a track-based mass transfer system having multiple mass transfer devices 1102-1112 used to adjust a vehicle's center of gravity and provide pitch and roll stability according to one embodiment of the invention. In addition to providing pitch and/or roll stability, the track-based mass transfer system can also be used to adjust the vehicle's center of gravity and/or angle of attack, thereby enhancing its stability at speed.

Typically, airships locate their center of gravity aft of where the center of pressure forms on the hull. This configuration leads to pronounced pitch, roll and yaw moments (sometimes referred to as "porpoising"), which generally increase in intensity as airspeed increases. The mass transfer system 400 performs well at low airspeeds and/or while hovering, where pitch and roll moments are relatively mild, but would be placed under increasingly higher demands at higher airspeeds. To minimize the demands on the mass transfer devices 410, 412, 414, 416, the mass transfer system 400 can also be configured to shift the airship's center of gravity toward the center of pressure while the airship 100 is operating at higher speeds, thereby decreasing the intensity of the pitch and roll moments that the mass transfer system 400 is called upon to counteract. This is accomplished by adding two or more mass transfer devices to the mass transfer system 400, as more particularly described below.

In one embodiment, the airship 100 is a lenticular disc and therefore functions as a low aspect ratio wing, which generates even greater pitching moments than a traditional cigar-shaped airship. Accordingly, a lenticular airship may need larger control surfaces, which would negate many of the aerodynamic advantages of the lenticular disc shape. Therefore, the use of the mass transfer devices to adjust the center of gravity, while advantageous to all airship designs, may be particularly advantageous to a lenticular disc shaped airship such as airship 100.

In one embodiment of the invention, an airship 100 employs six (6) mass transfer devices 1102-1112 located along tracks positioned along the internal equator of the airship 100. At any given time, two (2) of those mass transfer devices (e.g., 1106 and 1108) may remain fixed and dedicated to maintaining the center of gravity (CG) at a given position (the "fixed CG mass transfer devices"), while the other four (4) mass transfer devices (e.g., 1102, 1104, 1110 and 1112)

may move along their respective tracks to stabilize the airship 100 by correcting pitch and/or roll moments (the "variable stability mass transfer devices").

As discussed above, an airship becomes unstable at and above a certain airspeed, which airspeed will vary depending upon the exact type and profile of the airship. For illustrative purposes, the speed at which a particular airship becomes unstable in flight is defined herein as "X knots." Whether a particular mass transfer device functions as a fixed CG mass transfer device or a variable stability mass transfer device will depend upon the airspeed of the airship (i.e., whether the airship is traveling at an airspeed less than X knots, or at an airspeed equal to or greater than X knots).

FIG. 11A illustrates the position of the six (6) mass transfer devices 1102-1112 of a mass transfer system at an airspeed less than X knots. The mass transferring devices 1106 and 1108 function as fixed CG mass transfer devices and are placed in a stationary position near the center of the hull 102 to locate the center of gravity at the center of buoyancy, while the mass transfer devices 1102, 1104, 1110 and 1112 function as variable stability mass transfer devices and are free to move along their respective tracks as required to control the pitch and/or roll moments. This configuration is considered optimal for maximizing pitch and roll stability at an airspeed less than X knots and/or while hovering.

FIG. 11B illustrates the position of the same six (6) mass transfer devices 1102-1112 at an airspeed equal to or greater than X knots. The mass transferring devices 1102 and 1104 (which function as variable stability mass transfer devices at airspeeds below X knots as depicted in FIG. 11A) are now moved forward and placed in a stationary position at the terminus of their respective tracks to function as fixed CG mass transfer devices. The mass transfer devices 1106 and 1108 (which function as fixed CG sleds at airspeeds below X knots as depicted in FIG. 11A) now function as variable stability mass transfer devices and hence are free to move along their respective tracks as needed to control the pitch and/or roll moments. This configuration moves the center of gravity forward and is considered optimal for maximizing pitch and roll stability at airspeeds equal to or greater than X knots. In addition to their function as variable stability mass transfer devices, the mass transfer devices 1106, 1108, 1110 and 1112 can be positioned to vary the airship's angle of attack to maintain a constant lift (or variable lift as desired) as airspeed changes.

Figure 12A:
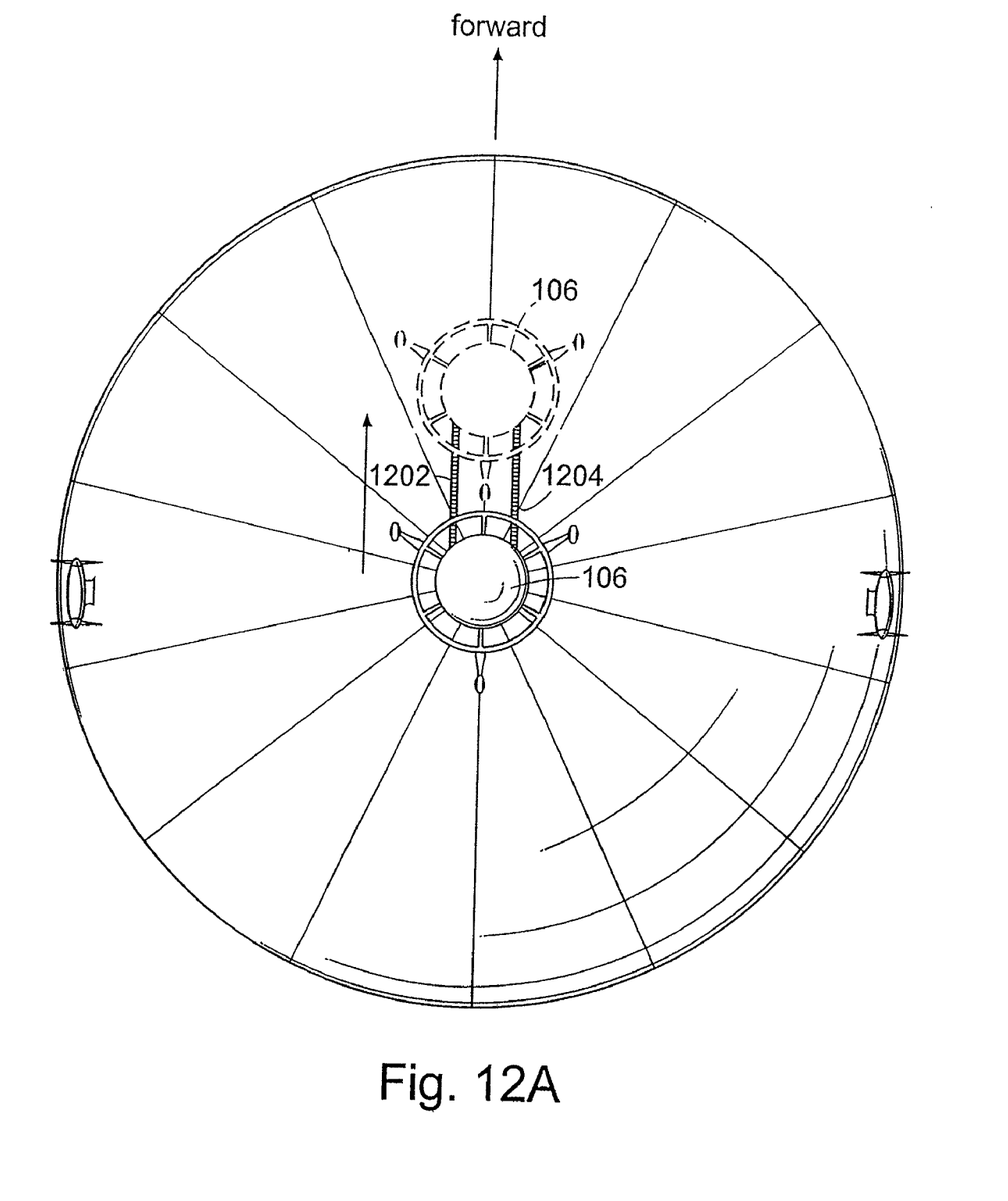
FIG. 12A illustrates a movable gondola attached to a track, which can also be used to adjust a vehicle's center of gravity according to one embodiment of the invention.

FIG. 12A illustrates a movable gondola 106 attached to tracks 1202 and 1204 for adjusting the airship's center of gravity by moving the gondola 106 forward or aft along tracks 1202 and 1204. With respect to adjusting an airship's center of gravity, this system functions in a manner similar to, and accomplishes the same result as, the mass transfer system described above. At low airspeeds and/or while hovering, the gondola 106 will be positioned at the center of the hull 102, causing the center of gravity to be located at the center of buoyancy. As airspeeds increase, the gondola 106 will move forward along tracks 1202, 1204, causing the center of gravity to move forward as required for stability.

Figure 12B:
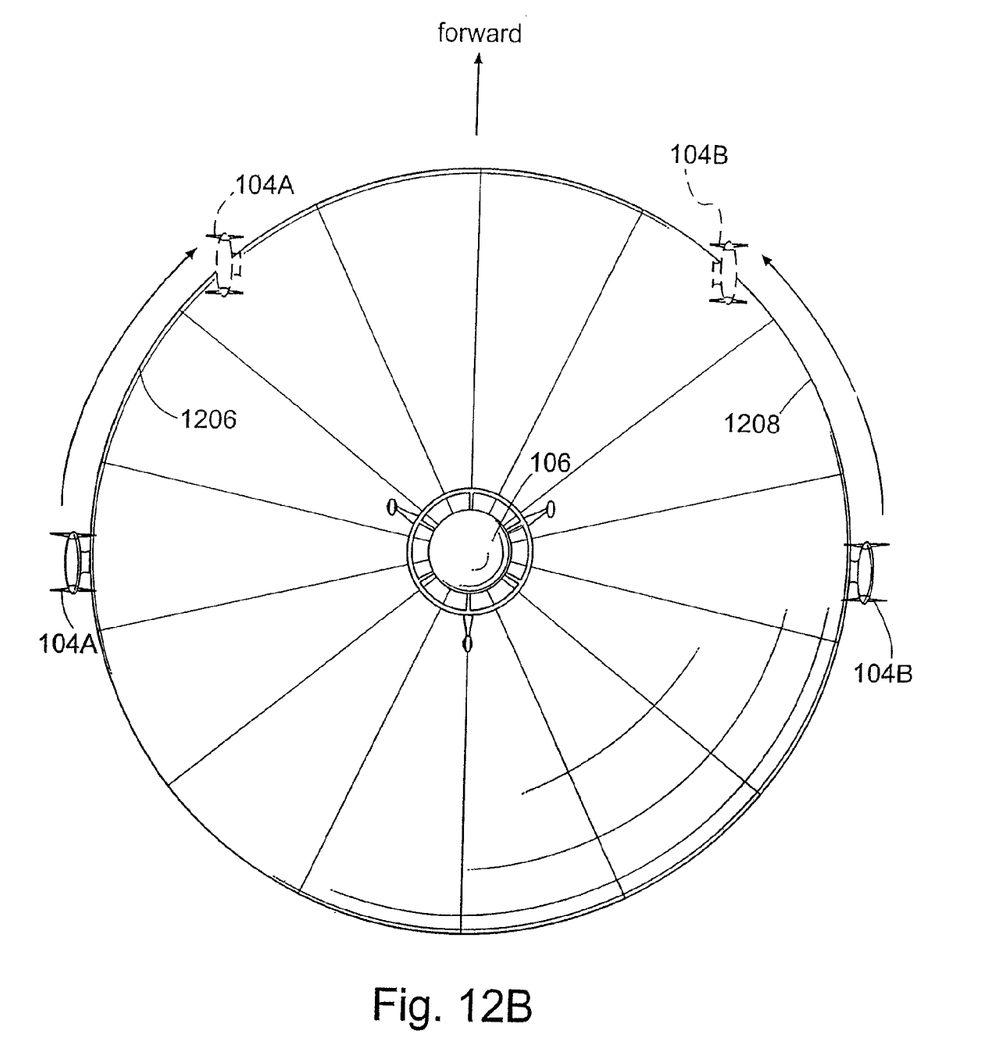
FIG. 12B illustrates one or more movable propulsion motors attached to one or more tracks, which can also be used to adjust a vehicle's center of gravity according to one embodiment of the invention.

FIG. 12B illustrates one or more movable propulsion motors 104A and 104B for adjusting the airship's center of gravity by moving one or more propulsion motors 104A and 104B forward or aft along one or more tracks 1206 and 1208. With respect to adjusting an airship's center of gravity, this system functions in a similar manner to, and accomplishes the same result as, the mass transfer system described above. At low airspeeds and/or while hovering, the one or more propulsion motors 104A and 104B are positioned near the midpoint of the hull 102, causing the center of gravity to be located at the center of buoyancy. As airspeeds increase, the one or more propulsion motors 104A and 104B move forward along tracks 1206 and 1208, causing the center of gravity to move forward as desired. The one or more propulsion motors 104A and 104B may be mounted to the tracks 1206 and 1208 by means of a coupling mechanism that allows the one or more propulsion motors 104A and 104B to swivel as necessary to maintain a forward orientation while moving along the tracks 1206 and 1208.

Figure 13:
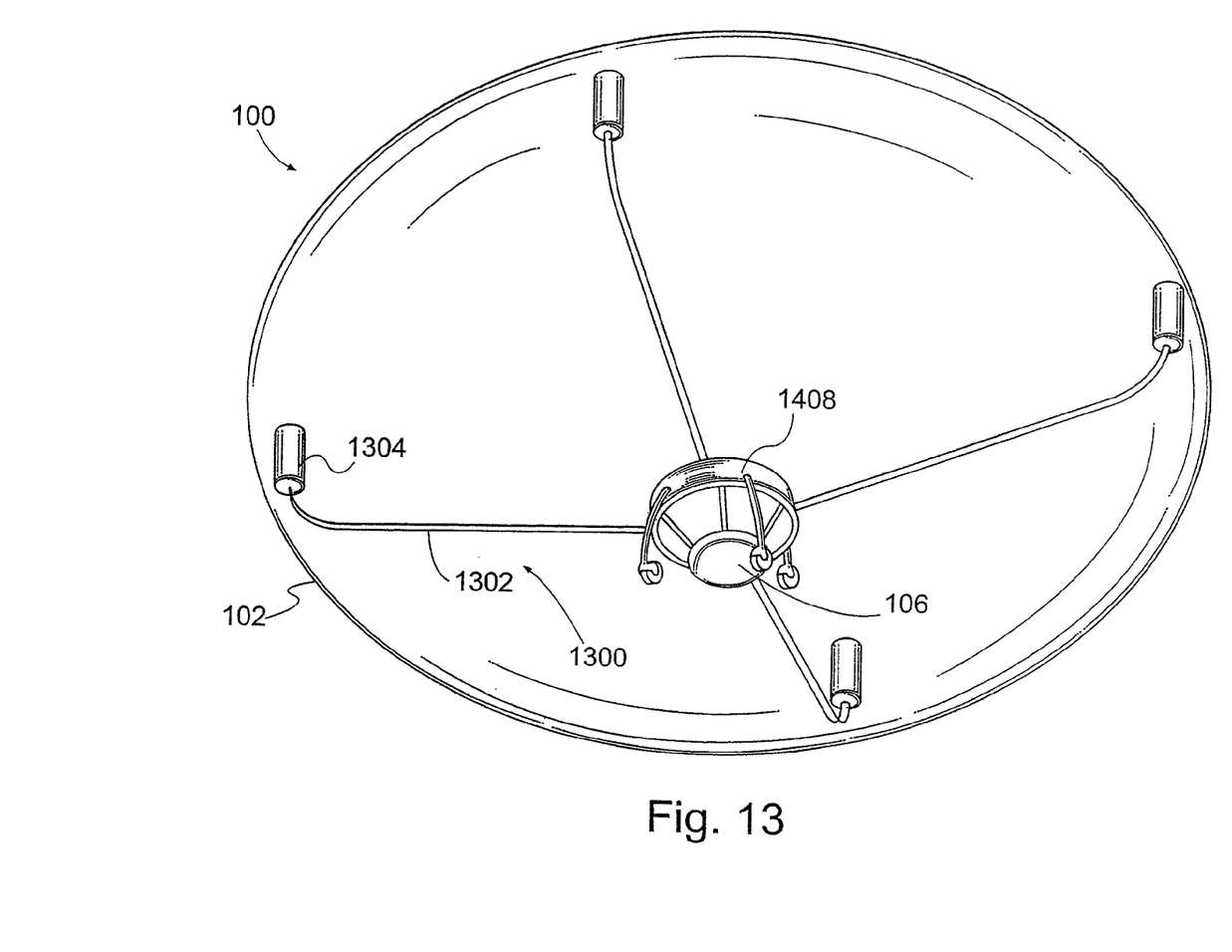
FIG. 13 illustrates a fluid mass transfer system for controlling the pitch and roll of the airship of FIG. 1 according to one embodiment of the invention.

FIG. 13 illustrates another embodiment of the mass transfer system, which includes a fluid mass transfer system 1300 in which one or more fluid conduits or lines 1302 selectively distribute a fluid to one or more tanks 1304 positioned near the internal or external equator of an airship 100 to control the pitch and/or roll of the airship 100 as desired, in a similar manner to the track-based mass transfer system 400. One or more sensors (e.g., 1004 and 1006) are used to detect the pitch and/or roll of the vehicle and provide one or more corresponding output signals. An on-board controller or CPU 1002 receives the one or more output signals from the one or more sensors and provides one or more signals to cause the transfer of fluid to and from one or more of the plurality of tanks 1304 to achieve a desired vehicle pitch and/or roll orientation. The fluid mass transfer system 1300 may include one or more pumps coupled to the plurality of lines 1302 to move the fluid to and from one or more of the plurality of tanks 1304. Additionally, a plurality of valves may be coupled to the plurality of lines 1302 to control fluid flow to and from one or more of the plurality of tanks 1304. The controller may selectively activate or deactivate the one or more pumps and/or the plurality of valves to achieve a desired vehicle pitch or roll orientation.

The plurality of fluid lines 1302 radiate outwards from the center portion of the airship 100 and are used to selectively distribute a fluid to one or more reservoir tanks 1304 positioned near the internal or external perimeter of the hull 102. The mass transfer system 1300 is able to transfer fluid to the one or more tanks 1304 located inside or outside the hull 102, but near the equator of the vehicle 100, to stabilize and/or tilt the airship 100 in any direction and along any axis and to control the location of its center of gravity.

Figure 14:
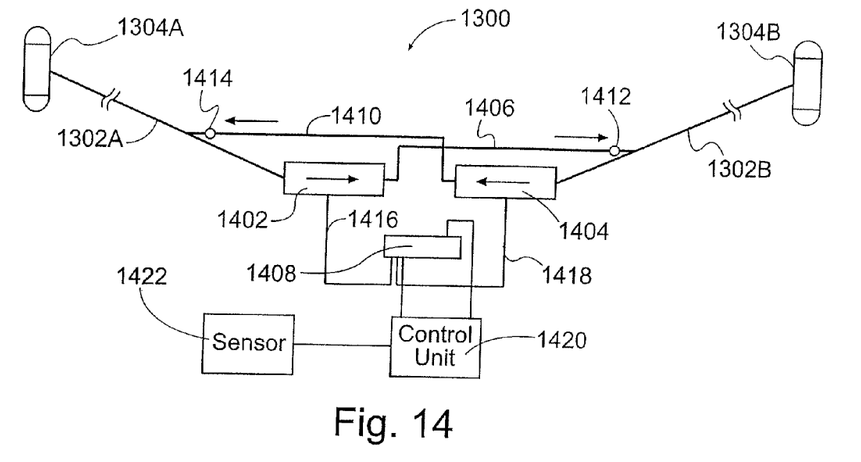
FIG. 14 illustrates a block diagram of the fluid mass transfer system of FIG. 13 according to one embodiment of the invention.

FIG. 14 illustrates a block diagram of the fluid mass transfer system 1300 for controlling the movement of an airship 100 according to one embodiment of the invention. The fluid mass transfer system 1300 may also include a plurality of pumps 1402, 1404 that serve to pump a fluid from one tank to another, thereby achieving a desired weight distribution. A plurality of conduits or pipes and valves may be employed as part of the fluid mass transfer system 1300. For example, a pipe 1302A carries fluids from the tank 1304A to the pump 1402 and then to the tank 1304B (via the pipe 1406) or to a storage reservoir 1408 (via the pipe 1416). The pipes 1406 and 1410 may include one-way valves 1412 and 1414, respectively, to prevent the fluid from flowing in the wrong direction. The pumps 1402 and 1404 may be coupled to the storage reservoir 1408 using the pipes 1416 and 1418, respectively, which can be used to carry the fluid to/from the storage reservoir 1408, as needed.

According to one embodiment of the invention, the fluid mass transfer system 1300 includes a control unit 1420 (e.g., a computer-controlled digital system or analog system) that controls the operations of the pumps 1402 and 1404 to transfer mass (e.g., fluid) between the tanks 1304A and 1304B and/or the storage reservoir 1408 to achieve the desired orientation of the airship 100. One or more sensors 1422 may provide roll or pitch information to the control unit 1420 so that it may control the fluid mass transfer system 1300 accordingly. For instance, if it is desired to tilt the airship 100 in a first direction, fluid may be pumped into the tank 1304A, from the tank 1304B and/or the storage reservoir 1408, to increase the weight at that part of the airship 100.

Figure 15:
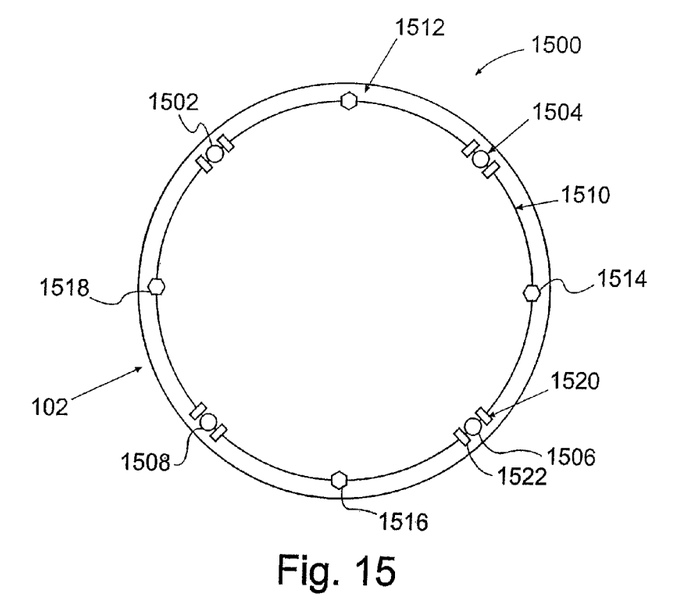
FIG. 15 illustrates a top view of a fluid mass transfer system for controlling the pitch and roll of the airship of FIG. 1 according to one embodiment of the invention.

FIG. 15 illustrates a top view of a fluid mass transfer system 1500 for controlling the pitch and/or roll of an airship 100 according to another embodiment of the invention. In this embodiment, four tanks 1502, 1504, 1506, 1508 are arranged or disposed around the interior equator of the hull 102. The four tanks 1502, 1504, 1506, 1508 are interconnected by a bi-directional fluid transfer conduit 1510 that forms a ring around the interior of the hull 102. The bi-directional fluid transfer conduit 1510 serves to transfer fluid between tanks 1502, 1504, 1506 and 1508 to cause the vehicle to roll and/or pitch as desired.

The fluid mass distribution system 1500 may include a plurality of bi-directional pumps 1512, 1514, 1516 and 1518 to pump the fluid through the conduit 1510 in either direction. The bi-directional pump (e.g., 1512) may be placed between two tanks (e.g., 1502 and 1504) to pump the fluid between those tanks. Additionally, check valves 1520 and 1522 may be placed along or in-line with the conduit 1510 at one or both sides of a tank 1506 to control the flow of fluid. That is, the check valves 1520 and 1522 may be opened or closed to either retain fluid in a particular tank or permit the fluid to flow to a tank further down the conduit 1510.

While various airships have been described, the mass transfer systems disclosed herein may be implemented in many other vehicles (e.g., hybrid aircraft, blimps, boats, ships, airplanes, underwater craft, submarines, etc.) and mediums (air, water and space) where stability, pitch and/or roll control, and/or center of gravity control are desired. For instance, the mass-transfer system may be implemented in a watercraft (e.g., boat, ship, racing yacht) to provide pitch and roll control and/or stability. In such watercraft implementations, the mass-transfer system may be similar to the ones described above and may be located inside or outside of the watercraft's hull.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method for stability control of a vehicle comprising:
   sensing the pitch or roll of the vehicle;
   providing a signal corresponding to the sensed pitch or roll of the vehicle;
   providing four tanks that are positioned at an equator and a perimeter of a hull of the vehicle, the four tanks being positioned an equidistantly from a center of gravity of the vehicle and at substantially symmetrical locations within the hull;
   providing a storage reservoir for holding fluid, the storage reservoir being positioned at the center of gravity of the vehicle; and
   distributing a selected amount of the fluid from the storage reservoir to at least one of the four tanks based on the signal sensed to achieve a desired vehicle pitch or roll orientation.

2. The method of claim 1 wherein the hull has a lenticular shape.

* * * * *